United States Patent
Randriamasy et al.

(10) Patent No.: US 9,204,358 B2
(45) Date of Patent: Dec. 1, 2015

(54) METHOD FOR PRIORITIZING HANDOVER TARGETS FOR SCANNING BY A MOBILE TERMINAL IN A WIRELESS NETWORK

(75) Inventors: Sabine Randriamasy, Meudon (FR); Veronique Capdevielle, Magny les Hameaux (FR)

(73) Assignee: Alcatel Lucent, Boulogne-Billancourt (FR)

( * ) Notice: Subject to any disclaimer, the term of this patent is extended or adjusted under 35 U.S.C. 154(b) by 227 days.

(21) Appl. No.: 13/143,391

(22) PCT Filed: Jan. 7, 2010

(86) PCT No.: PCT/EP2010/000055
§ 371 (c)(1),
(2), (4) Date: Sep. 22, 2011

(87) PCT Pub. No.: WO2010/079137
PCT Pub. Date: Jul. 15, 2010

(65) Prior Publication Data
US 2012/0008593 A1    Jan. 12, 2012

(30) Foreign Application Priority Data
Jan. 8, 2009    (EP) .................................... 09290015

(51) Int. Cl.
*H04W 4/00*    (2009.01)
*H04W 36/32*    (2009.01)

(52) U.S. Cl.
CPC .................................... *H04W 36/32* (2013.01)

(58) Field of Classification Search
USPC .............. 370/328, 331; 342/357.64; 455/430, 455/436, 437, 438
See application file for complete search history.

(56) References Cited

U.S. PATENT DOCUMENTS 5,848,063 A * 12/1998 Weaver et al. ................. 370/331
6,061,337 A *  5/2000 Light et al. .................... 370/331
(Continued)

FOREIGN PATENT DOCUMENTS

CN    1723656    1/2006
JP    2007-295123    11/2007
(Continued)

OTHER PUBLICATIONS

Paul Boone et al., "Strategies for Fast Scanning and Handovers in WiMAX/802.16," BWIA—First International Workshop on Broadband Wireless Access (IEEE Accessnets 2007), XP002532107, 7 pages, Aug. 24, 2007.
(Continued)

*Primary Examiner* — Gregory Sefcheck
*Assistant Examiner* — Jael Ulysse
(74) *Attorney, Agent, or Firm* — Fay Sharpe, LLP

(57) ABSTRACT

A method for prioritizing handover targets for scanning by a mobile terminal, MS (6), in a wireless network (1) having a plurality of network elements (2 to 5), comprises a network element (2) receiving a signal from an MS (6) for which it is the serving network element and the network element detecting the direction from which it receives the signal from the MS. For the detected direction, the network element obtains, from a data store (2B) associated with the network element (2), probabilities of successful handover to respective different neighboring network elements. The network element (2) uses the probabilities in prioritizing scanning order of neighboring network elements and sends information about the prioritized scanning order to the MS (6). The network may be a WiMAX network in which the network elements are base stations.

19 Claims, 2 Drawing Sheets

(56) References Cited

U.S. PATENT DOCUMENTS

| | | | |
|---|---|---|---|
| 6,208,859 B1* | 3/2001 | Halvorson | 455/430 |
| 6,477,373 B1* | 11/2002 | Rappaport et al. | 455/436 |
| 6,990,344 B1* | 1/2006 | Dolan et al. | 455/437 |
| 7,110,766 B1* | 9/2006 | Tayloe et al. | 455/438 |
| 7,764,975 B2 | 7/2010 | Hosono et al. | |
| 8,031,113 B2* | 10/2011 | Gaal et al. | 342/357.64 |
| 2002/0032034 A1* | 3/2002 | Tiedemann et al. | 455/437 |
| 2004/0097234 A1* | 5/2004 | Rajkotia et al. | 455/442 |
| 2004/0147267 A1* | 7/2004 | Hill et al. | 455/456.1 |
| 2005/0255847 A1* | 11/2005 | Han et al. | 455/436 |
| 2006/0153133 A1 | 7/2006 | Zhong | |
| 2006/0239238 A1* | 10/2006 | Fernandez-Corbaton et al. | 370/342 |
| 2007/0025294 A1* | 2/2007 | Kim et al. | 370/331 |
| 2007/0086387 A1* | 4/2007 | Kang et al. | 370/331 |
| 2008/0075035 A1* | 3/2008 | Eichenberger | 370/328 |
| 2008/0186917 A1* | 8/2008 | Wu et al. | 370/331 |
| 2008/0287125 A1* | 11/2008 | Hind et al. | 455/432.1 |
| 2009/0088131 A1* | 4/2009 | Gholmieh et al. | 455/410 |
| 2009/0156210 A1* | 6/2009 | Ponce De Leon et al. | 455/436 |
| 2010/0069070 A1* | 3/2010 | Shi et al. | 455/436 |
| 2010/0103903 A1* | 4/2010 | Park et al. | 370/331 |
| 2010/0151862 A1* | 6/2010 | Park et al. | 455/436 |
| 2010/0278141 A1* | 11/2010 | Choi-Grogan et al. | 370/331 |

FOREIGN PATENT DOCUMENTS

| | | | |
|---|---|---|---|
| JP | 2007-536784 | 12/2007 | |
| KR | 10-2008-0015822 | 2/2008 | |
| WO | WO 98/25429 A | 6/1998 | |
| WO | WO 98/32262 A | 7/1998 | |
| WO | WO2005/109689 | 11/2005 | |
| WO | WO 2007/105999 A | 9/2007 | |
| WO | WO 2007105999 A1 * | 9/2007 | H04Q 7/38 |

OTHER PUBLICATIONS

International Search Report for PCT/EP2010/000055 dated Mar. 9, 2010.

* cited by examiner

US 9,204,358 B2

METHOD FOR PRIORITIZING HANDOVER TARGETS FOR SCANNING BY A MOBILE TERMINAL IN A WIRELESS NETWORK

FIELD OF THE INVENTION

The present invention relates to a method for prioritizing handover targets for scanning by a mobile terminal in a wireless network, and more particularly, but not exclusively, to broadband access mobile networks.

BACKGROUND OF THE INVENTION

In a wireless network comprising a plurality of access nodes via which a user device may access the network, it may be desirable to offer support for mobility of the user device, for example, to manage the user device moving from a one cell of the network to another cell, or where changing radio conditions, for example, make it necessary for the user device to handover to a new serving node to maintain connectivity.

Types of network currently under development are intended to permit broadband wireless access, such as networks in accordance with IEEE 802.16 standards, also sometimes referred to as WiMAX. In WiMAX, access nodes are usually referred to as base stations and the user device as a mobile subscriber station.

In WiMAX, a mobile subscriber station in communication with a serving base station, and wishing to initiate handover to another target base station, scans the frequencies of neighboring base stations until it finds a downlink signal. During scanning by the mobile subscriber station, payload data communication is interrupted to enable different frequencies to be scanned. A paper by Boone et al., "Strategies for Fast Scanning and Handovers in WiMax/802.16", BWIA-First International Workshop on Broadband Wireless Access (IEEE ACCESSNETS 2007), Aug. 22-24, 2007, Ottawa, Ontario, Canada, proposes strategies for reducing the time required for scanning operations while performing handover between neighboring base stations in a WiMAX network. One suggested strategy is for the mobile subscriber station to build a history of handovers between base stations it has visited and for the mobile subscriber station to use this to determine which base station is the most likely neighbour target base station for a handover. The most likely candidate is scanned for first.

BRIEF SUMMARY

According to a first aspect of the invention, a method for prioritizing handover targets for scanning by a mobile terminal, MS, in a wireless network having a plurality of network elements, comprises a network element receiving a signal from an MS for which it is the serving network element and the network element detecting the direction from which it receives the signal from the MS. For the detected direction, the network element obtains, from a data store associated with the network element, probabilities of successful handover to respective different neighboring network elements. The network element uses the probabilities in prioritizing scanning order of neighboring network elements and sends information about the prioritized scanning order to the MS. The MS may be a handset, portable notebook, or some other device configured to interact with the network and having mobility such that handover from one network element to another is required from time to time.

One method in accordance with the invention is used with a WiMAX network, in which the network element is a base station and the mobile terminal is a mobile subscriber station. A method in accordance with the invention may be used in other types of wireless network, for example, in a 3GPP Long Term Evolution (LTE) implemented network, in which case the network element is an eNodeB and the MS is referred to as an UE (user equipment). A method in accordance with the invention may be used with other types of network technology involving handover from one network element to another, and is not necessarily constrained to fourth generation (4G) networks or to networks offering broadband mobile access.

A method in accordance with the invention may be applied, for example, where handover takes place within a single network, or between different networks of the same technology type. In one embodiment, a method in accordance with the invention is used in handover from a network element included in a network of one technology type to a target network element in a network of a different technology type.

By using a method in accordance with the invention, the number of scanning operations required to find a downlink signal to achieve successful handover is likely to be reduced. Neighbouring network elements having cells to which the MS is unlikely to move are less likely to be scanned and resources are concentrated on those having a higher likelihood of being selected. Thus, fewer network resources may be required and the time devoted to scanning reduced, this being particularly advantageous when the MS is engaged in real time applications, such as for example streaming video and VoIP, where interrupted transmission of payload data is undesirable. Handover events may be frequent depending on the network set up and what parameters are used to trigger handover. By using a method in accordance with the invention, frequent handovers may be less detrimental than might otherwise be the case.

In one embodiment, all neighboring network elements that are capable of communicating with the MS may be included in the information sent to the MS. The scanning carried out by the MS is only as much as is required until a suitable target network element is identified. Thus, even where a relatively large number of neighboring network elements is capable of communicating with the MS, this does not unnecessarily burden resources as scanning any particular network element will only be carried out if the preceding 'best' neighboring network element, or elements, in the scanning order is unsatisfactory as a target. By adopting this approach, the risk is reduced that a possible candidate, however unlikely, is discarded or discounted instead of being communicated to the MS. This is particularly beneficial in circumstances where only a small number of neighboring network elements exist. In another embodiment, a selected group of neighboring network elements may be used instead of all of them, for example, by excluding any with less than a predetermined threshold probability of being a target network element in a successful handover.

It may not be necessary for any particular MS to show periodicity and homogeneity in its movement across the network in order to obtain benefit from the invention. Thus, the invention may be usefully applied both where an MS shows a commuting pattern in which it follows a regular route on different occasions, and also where no regular pattern is discernable.

The network element may comprise the data store. Alternatively, the data store may be included in another network component, for example, a component dedicated solely to maintaining the data store, or be included in a different neighboring network element holding records pertaining to several network elements, or be included in a component of a different type to the network element. For example, where the network element is, say, a base station in a WiMAX network, the data store could be included in a related Access Service Network Gateway (ASN-GW). Where the data store is at a remote location it may accessible to only a single network element. Alternatively it could be accessible to a group of network elements, in which case information is stored for a larger number of handover permutations.

By including the data store as a part of the network, whether included in the network element or separate therefrom, it may be possible to store larger amounts of data, for example, data regarding many successful handovers for different MSs and directions, compared to what may be achievable with a portable, non-network data store.

The data store may include information about successful handover to neighboring network elements and direction of the signal received from MSs. The data store may comprise a table mapping direction against probability of successful handover for a plurality of target network elements.

Using one method in accordance with the invention, over time, input concerning a plurality of different MSs and their success in achieving handover to various network elements may be used to update the data held in the data store and improve statistical reliability.

In one embodiment, the network element may use at least one other parameter in prioritizing scanning order of neighboring network elements. For example, the probability of handover for a given direction may be combined with other requirements such as bit error rate, signal strength, cell loading constraints, or another factor or factors for filtering or organizing, to provide a prioritized scanning order of neighboring network elements for transmission to the MS.

In one embodiment, the network element detects the direction from which it receives the signal from the MS. This may be done using a goniometer or direction-finder located at the network element. For example, the direction from which the signal is received may be determined using directional characteristics of a receiving antenna arrangement at the network element, or by some other method. The direction may be solely an azimuthal direction, for example, but using a direction that involves both azimuth and elevation co-ordinates offers additional refinement in implementing the method. In another embodiment, the network element obtains the direction of the signal from the MS relative to itself by accessing an information source based elsewhere, for example, a store holding location co-ordinates of the MS updated via GPS or some other location monitoring system.

In one embodiment of the invention, the direction of the signal is obtained at the time when the network element receives a scanning request from the MS. In one method, the network element ignores any subsequent scanning requests from the MS.

BRIEF DESCRIPTION OF THE DRAWINGS

Some embodiments of the present invention will now be described by way of example only, and with reference to the accompanying drawings, in which.

DETAILED DESCRIPTION

Figure 1:
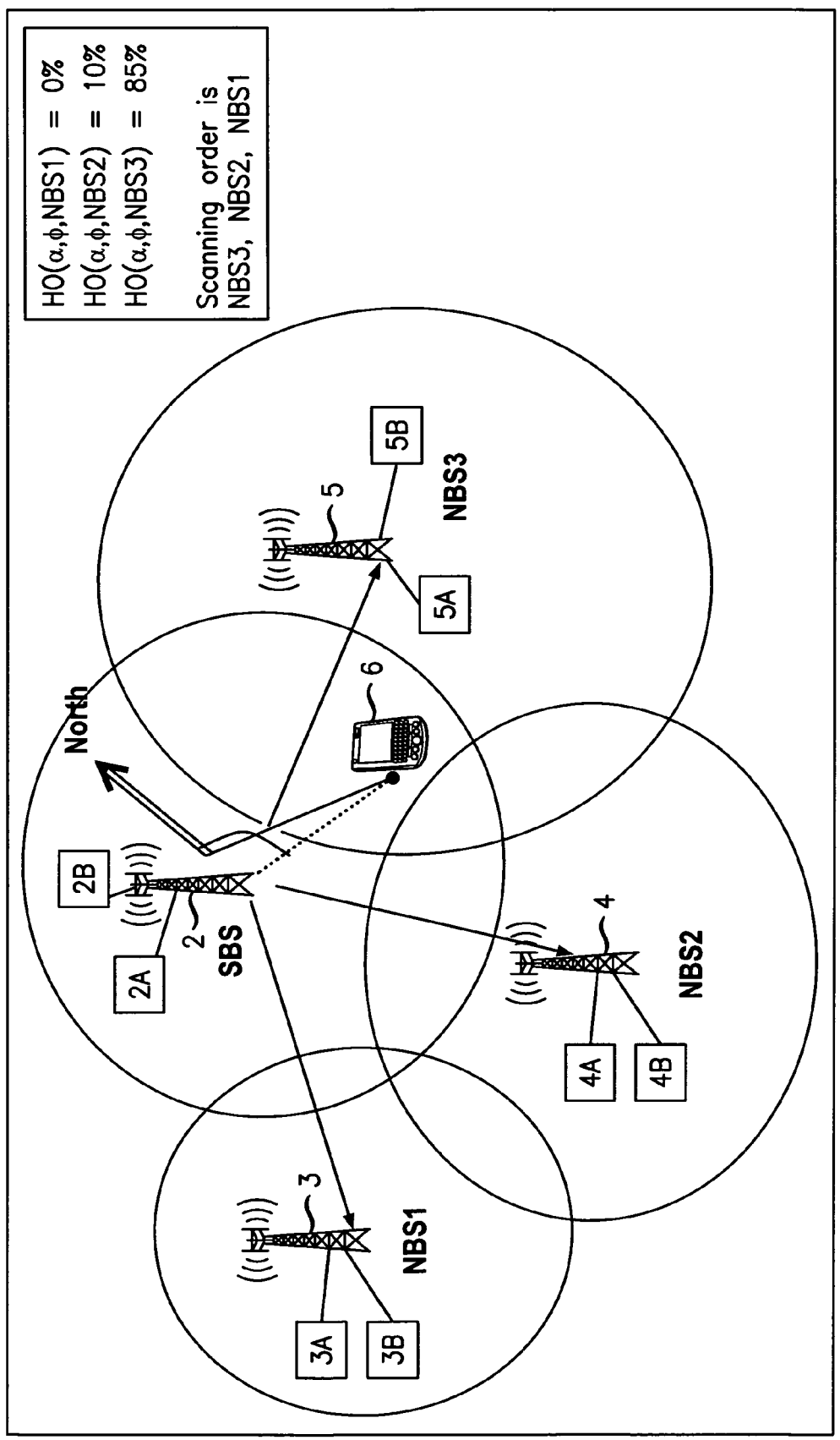
FIG. 1 schematically illustrates one embodiment in accordance with the invention.

With reference to FIG. 1, a WiMAX network 1 includes a plurality of base stations (BSs), four of which 2, 3, 4 and 5 are shown schematically. An MS 6 is in communication with one of the base stations, which is its serving base station 2. Each base station 2, 3, 4 and 5 includes a direction finder or goniometer 2A, 3A, 4A and 5A respectively and a data store 2B, 3B, 4B and 5B respectively. Each data store 2B, 3B, 4B and 5B comprises a table that provides the probability of successful handover (HO) from that base station to each of the neighboring base stations for a given direction of a signal received from an MS. Thus, the serving base station 2 has a data store 2B that gives successful handover probability from it to base station 3 for any given direction, handover probability to base station 4 for any given direction, and also to base station 5 for any given direction.

When the MS 6 detects the necessity to perform a handover, it must scan a list of neighboring base stations (NBS) to find a downlink signal. The MS 6 sends to its serving BS 2 (SBS) a scanning request MOB_SCN-REQ containing its identifier MS_ID and a list L1 of NBS that the MS 6 considers to be possible candidate target base stations. On receiving the scanning request from the MS 6, the serving base station 2 captures the direction of the signal received from the MS 6, at time $t_{SCN\_REQ}$ when the MS 6 sends its scanning request. In this method, the direction detected by the goniometer 2A includes both azimuth and elevation information. The azimuth angle $\alpha$ and elevation angle $\phi$ are rounded to A and $\Phi$. Rounding requires less storage space and great accuracy may be difficult to achieve in any case. The data store stores value intervals, for example, 5%, 10%, of direction angles. It is particularly useful to capture the direction of the MS signal in both its horizontal and vertical dimensions in uneven areas such as dense urban business centres or hilly regions, where the cell coverage changes both horizontally and vertically. In such contexts, MS movements may include a large part of verticality and/or cell coverage may be superimposed in some areas. However, in other embodiments, only azimuth information is captured.

Figure 2:
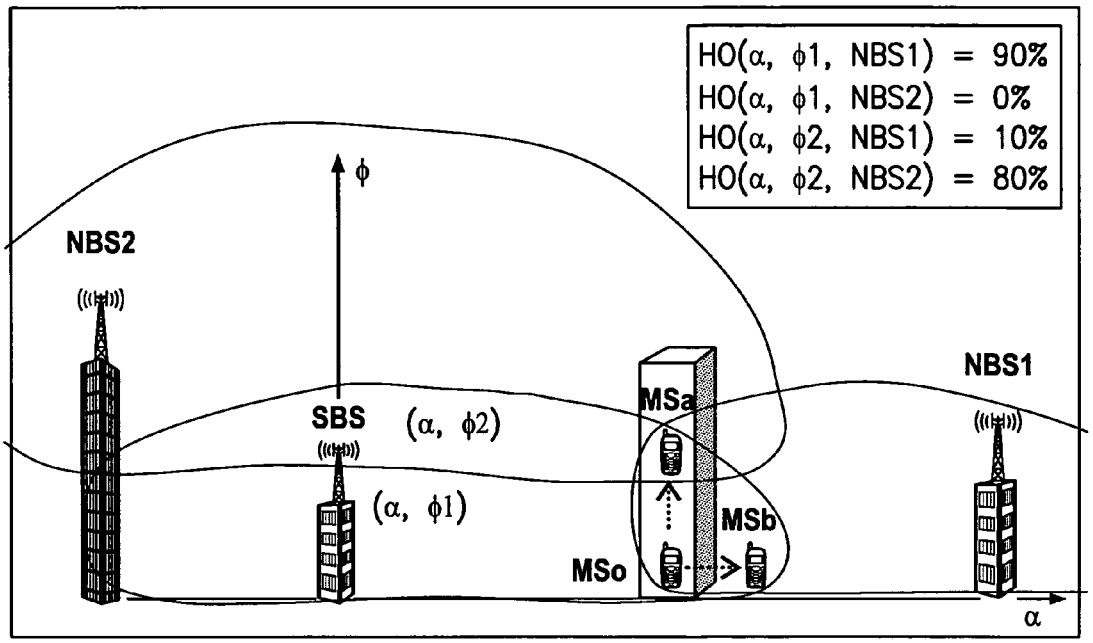
FIG. 2 is a schematic exemplary illustration relating to the FIG. 1 embodiment.
Figure 3:
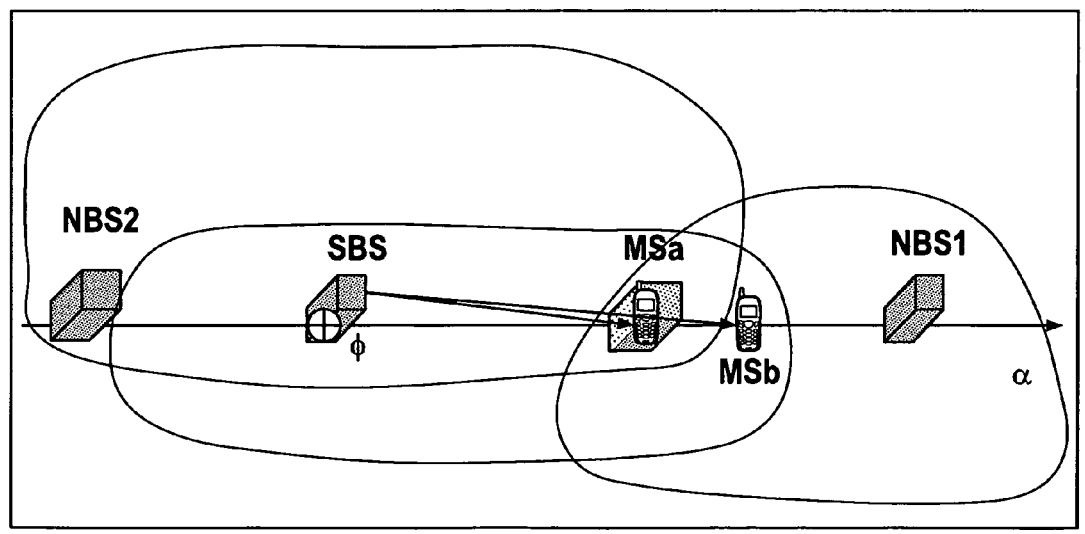
FIG. 3 is a schematic exemplary illustration relating to the FIG. 1 embodiment.

FIG. 2 and FIG. 3 illustrate how the direction of the (MS, BS) axis in its horizontal and vertical aspects may be considered. With reference to FIG. 2, the MS may move from a start position MSo either in a vertical direction to position MSa or a horizontal direction to position MSb. When it moves to MSa, if only the horizontal direction is taken into account, it might be thought that NBS1 would be the best choice of target BS. However, from the probabilities of successful handover listed, it is apparent that NBS2 would be most appropriate. Where movement to position MSb occurs, the choice would be NBS1 when both vertical and horizontal angles are taken into account. FIG. 3 illustrates the same scenario as FIG. 2 but taking only the horizontal direction into account. With this limited information, MSa may be declared to be likely to move to NBS1 when it is actually moving to NBS2.

The base station uses the rounded angle information in accessing information in the data store 2B to obtain {PHO(Jn, A, $\Phi$)=Pn} where Jn represents neighboring base stations and which gives the probabilities Pn of successful handover to NBSs for the direction A and $\Phi$. The serving base station 2 orders the NBS Jn according to decreasing values of Pn, to obtain a list L2.

The base station 2 replies to the MS 6 with a scanning response message MOB_SCN-RSP containing the list L2. The MS 6 then scans the NBS following the order of list L2. When a suitable candidate base station for HO is found, the usual handover procedure is then followed.

Between the sending of a scanning request and the execution of the HO, the MS may make a movement that is both significant and unpredictable. The handover probability table PHO(Jn, A, Φ) reflects the position of an MS when it sent the scanning request rather than the position of the MS when it executed the HO.

The scanning thus first processes those NBS that have statistically greater chances to provide a feasible downlink channel, given the history of HO and the direction of the impacted MS when it requested for scanning. It is likely that a suitable downlink channel is found before "unlikely" NBS are scanned.

The probability of carrying out a HO from the BS to a NBS given a direction D can be represented by the ratio, given D, of HO to this NBS to the total number of outgoing HO. In this embodiment, the HOs to take into account are those that have resulted in a successful ranging to the TBS.

The data store at each base station is updated when a successful handover from that base station to a neighboring base station is achieved. The data updated is the n-tuple $(MS\_ID, \alpha, \phi, .t_{SCN\_RQ})$, where angle $\alpha \in [-180°, 180°]$ is the azimuth with respect to, for instance the north direction, and $\phi \in [0, 90]$, the elevation angle with respect to the horizontal plane.

The base station includes a function to maintain the directional HO probability table PHO(Jn, A, Φ) where J points to a neighbour BS, A and Φ are value intervals, for example, 5%, 10%, of direction angles, and table PHO(Jn, A, Φ) is the proportion of handovers to NBS J performed by an MS that had sent a scanning request signal with direction (A, Φ).

HO counters that report the number or proportion of HOs to a NBS are usually maintained in either the BS or the ASN-gateway. In this embodiment, the BS stores and updates the following information which the ASN gateway can easily access if needed: (a) a list L_SCN of scanning stage direction n-tuples $(MS\_ID, \alpha, \phi, .t_{SCN\_RQ})$, where $t_{SCN\_RQ}$ is the date of the last valid scanning request sent by MS_ID; and (b) a "scanning direction aware" HO probability table PHO(Jn, A, Φ). In this table, the ID of the SBS is implicit and only the MS initiated HOs with prior direction finding and scanning are reported.

A single MS_ID may send several consecutive valid scanning requests for reasons such as cell selection interruption or scanning denial but only one is stored in the data store per MS, namely the one that potentially originates a successful HO up to target BS ranging.

A n-tuple $(MS\_ID, \alpha, \phi, t_1)$ is created at time t1 when the BS answers a MOB_SCN-REQ with a MOB_SCN-RSP containing a non null scan duration value d1. The n-tuple is deleted for reasons including: (a) another valid n-tuple has been originated by the same MS_ID $(MS\_ID, \alpha 2, \phi 2, t_2)$ with $t_2 > t_1 + d1$, where validity is determined by priority rules on successive scanning and HO requests; (b) the HO originated by the scanning process has been cancelled or has failed; or (c) it has resulted in a successful HO that has already been recorded in table PHO(Jn, A, Φ) and thus is already stored.

When a scanning request results in a successful HO to a NBS J, the SBS is notified via messages that may be, for example, backbone messages from the target BS or directly by the MS if specified in the RNG-RSP HO process optimization field. Upon notification, the SBS updates table PHO (Jn, A, Φ), where A and Φ are rounded up values of the α and φ values captured with the scanning request that has originated the HO. The rounding up of α and φ values depends among other things on the accuracy of the direction measurement and/or on storage policy. For example if the angle values are subdivided in samples of k=10 values, an example rounding up formula is: $\Phi(x) = x/k + k/2$, where x/k is the integer part of the division by k. If k=10 values, then $\Phi(x) = x/10 + 5$.

In this embodiment, the "MS direction based scan ordering" function may be combined with other functions meant to filter or organize the list of NBS recommended for scanning, upon criteria and constraints such as cell load, or reflecting the available QoS level.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The invention claimed is:

1. A method for prioritizing handover targets for scanning by a mobile terminal in a wireless network having a plurality of network elements, the method comprising:
   a network element receiving a signal from a mobile terminal for which it is a serving network element;
   the network element obtaining a direction from which it receives the signal from the mobile terminal via a direction finder;
   for said direction, the network element obtaining, from a data store associated with the network element, probabilities of successful handover to respective different neighboring network elements;
   the network element using the probabilities in prioritizing scanning order of neighboring network elements; and
   the network element sending information about the prioritized scanning order to the mobile terminal, wherein data stored in the data store includes an n-tuple (mobile terminal identification (ID), α, φ, .t SCN_RQ), where the mobile terminal ID identifies the mobile terminal, angle α is azimuth, φ is elevation and .t SCN RQ is a time the scanning request is sent by the mobile terminal.

2. The method as claimed in claim 1, wherein the signal received by the network element is a scanning request from the mobile terminal.

3. The method as claimed in claim 1, wherein the data store includes information about previous successful handovers from the serving network element to neighboring network elements and directions of the signal received from mobile terminals involved in previous successful handovers.

4. The method as claimed in claim 1, wherein the data store is updated when a successful handover from a first base station to a second base station is achieved, wherein the base stations comprise neighboring base stations.

5. The method as claimed in claim 1, wherein the direction is defined in horizontal and vertical terms.

6. The method as claimed in claim 1, wherein the n-tuple is deleted from the data store when: another valid n-tuple has been originated by the same mobile terminal ID(mobile terminal_ID, α2 ,φ2, t2) with t2>t 1 ÷d 1, where validity is determined by priority rules on successive scanning and handover (HO) requests; the HO originated by a scanning process has been cancelled or has failed; or it has resulted in a successful HO that has been already recorded in a handover probability table.

7. The method as claimed in claim 1, wherein the data store includes a table mapping direction against probability of successful handover for a plurality of target network elements.

8. The method as claimed in claim 1, wherein the network element comprises the data store.

9. The method as claimed in claim 1, wherein when the network element receives a plurality of valid consecutive signals from the mobile terminal, information relating to at least one of the plurality of valid consecutive signals is stored in the data store.

10. The method as claimed in claim 1, wherein the network element uses at least one other additional parameter in prioritizing scanning order of neighboring network elements.

11. The method as claimed in claim 1, wherein the network element detects the direction from which it receives the signal from the mobile terminal.

12. The method as claimed in claim 1, wherein the wireless network is implemented in accordance with broadband wireless access standards.

13. The method as claimed in claim 12, wherein the wireless network is implemented in accordance with IEEE 802.16 or WiMAX standards, or 3GPP standards.

14. A network element configured to:
receive a signal from a mobile terminal for which it is a serving network element;
obtain a direction from which it receives the signal from the mobile terminal via a direction finder;
for said direction, obtain, from a data store associated with the network element, probabilities of successful handover to respective different neighboring network elements;
use the probabilities in prioritizing scanning order of neighboring network elements; and
send information about the prioritized scanning order to the mobile terminal, wherein data stored in the data store includes an n-tuple (mobile terminal identification (ID), $\alpha$, $\phi$, .t SCN_RQ), where the mobile terminal ID identifies the mobile terminal, angle $\alpha$ is azimuth, $\phi$ is elevation and .t SCN_RQ is a time the scanning request is sent by the mobile terminal.

15. A method for prioritizing handover targets for scanning by a mobile terminal in a wireless network having a plurality of network elements, the method comprising:
a network element receiving a signal from a mobile terminal for which it is a serving network element;
the network element obtaining a direction from which it receives the signal from the mobile terminal;
for said direction, the network element obtaining, from a data store associated with the network element, probabilities of successful handover to respective different neighboring network elements;
wherein the stored data includes a first n-tuple (mobile terminal identification (ID), $\alpha$, $\phi$, .t $_{SCN\_RQ}$), created at time $t_1$, where the mobile terminal ID identifies the mobile terminal, angle $\alpha$ is azimuth, $\phi$ is elevation and .t $_{SCN\_}$RQ is a time a scanning request is sent by the mobile terminal,
wherein the first n-tuple is deleted from the data store and a second valid n-tuple has been originated by the same mobile terminal ID (mobile terminal_ID, $\alpha 2$, $\phi 2$, $t_2$) with $t_2 > t_1 + d1$, where validity is determined by priority rules on successive scanning and handover (HO) requests; the HO originated by a scanning process has been cancelled or has failed or has resulted in a successful HO that has been already recorded in a handover probability table; and
wherein the network element uses the probabilities in prioritizing scanning order of neighboring network elements and the network element sends information about the prioritized scanning order to the mobile terminal.

16. The method as claimed in claim 15, wherein the signal received by the network element is a scanning request from the mobile terminal.

17. The method as claimed in claim 15, wherein the data store includes information about previous successful handovers from the serving network element to neighboring network elements and directions of the signal received from mobile terminals involved in previous successful handovers.

18. The method as claimed in claim 15, wherein the data store is updated when a successful handover from a first base station to a second base station is achieved, wherein the base stations comprise neighboring base stations.

19. The method as claimed in claim 15, wherein the direction is defined in horizontal and vertical terms.

* * * * *